United States Patent
Marcondes et al.

(10) Patent No.: US 7,936,784 B2
(45) Date of Patent: May 3, 2011

(54) METHOD AND SYSTEM FOR OFFLOADED TRANSPORT LAYER PROTOCOL SWITCHING

(75) Inventors: Cesar A. C. Marcondes, Los Angeles, CA (US); Anders D. Persson, San Mateo, CA (US); Darrin P. Johnson, Mountain View, CA (US)

(73) Assignee: Oracle America, Inc., Redwood City, CA (US)

( * ) Notice: Subject to any disclaimer, the term of this patent is extended or adjusted under 35 U.S.C. 154(b) by 0 days.

(21) Appl. No.: 12/780,463

(22) Filed: May 14, 2010

(65) Prior Publication Data
US 2010/0223390 A1    Sep. 2, 2010

Related U.S. Application Data

(63) Continuation of application No. 11/638,777, filed on Dec. 14, 2006, now Pat. No. 7,746,901.

(51) Int. Cl.
*H04J 3/16* (2006.01)

(52) U.S. Cl. .......... 370/469; 370/389; 709/230; 709/250
(58) Field of Classification Search .......... 370/389, 370/469, 471; 709/219, 230, 250
See application file for complete search history.

(56) References Cited

U.S. PATENT DOCUMENTS

| | | | | |
|---|---|---|---|---|
| 5,257,369 | A * | 10/1993 | Skeen et al. | 719/312 |
| 6,467,087 | B1 * | 10/2002 | Yang | 717/168 |
| 6,678,283 | B1 * | 1/2004 | Teplitsky | 370/463 |
| 2001/0053148 | A1 * | 12/2001 | Bilic et al. | 370/389 |
| 2004/0156366 | A1 * | 8/2004 | Walls et al. | 370/394 |
| 2005/0086349 | A1 * | 4/2005 | Subramaniyan | 709/230 |
| 2005/0135412 | A1 * | 6/2005 | Fan | 370/463 |
| 2007/0025395 | A1 * | 2/2007 | Cardona et al. | 370/474 |
| 2007/0118665 | A1 * | 5/2007 | Philbrick et al. | 709/230 |

* cited by examiner

*Primary Examiner* — Ricky Ngo
*Assistant Examiner* — Rasheed Gidado
(74) *Attorney, Agent, or Firm* — Osha • Liang LLP

(57) ABSTRACT

A method for using offloaded transport layer protocols involves signaling a network interface controller (NIC) with a signal to use one of multiple transport layer protocols embedded in the NIC, and transmitting a data packet via the NIC using the transport layer protocol.

14 Claims, 3 Drawing Sheets

METHOD AND SYSTEM FOR OFFLOADED TRANSPORT LAYER PROTOCOL SWITCHING

CROSS-REFERENCE TO RELATED APPLICATIONS

Subject matter contained herein may be related to subject matter contained in copending U.S. patent application Ser. No. 11/639,042 entitled: "Method and System for Using Bayesian Network Inference for Selection of Transport Protocol Algorithm";Method and System for Bi-level Congestion Control for Multipath Transport"Ser. No. 11/638,904; "Method and System for Network Stack Tuning" Ser. No. 11/638,858; "Method and System for Profiling and Learning Application Networking Behavior" Ser. No. 11/638,891; and "Method and System for Bandwidth Allocation Using Router Feedback" Ser. No. 11/639,090; , respectively, and filed on Dec. 14, 2006, in the names of the same inventors and having the same assignee as the present application, the entire contents of which are hereby incorporated in their entirety.

BACKGROUND

In computer systems, a network stack is a logical separation of physical and software components into layers of networking functionality. Each layer in the network stack builds on functionality of the layer immediately beneath it, if one exists. Thus, each layer effectively provides a level of abstraction, whereby different implementations of each layer may be interchanged so long as the interfaces between the layers remain compatible.

Many different network stack models exist, and the same network configuration may be described using different network stack models. The Open Systems Interconnection (OSI) Reference Model is one example of a network stack model, and Transmission Control Protocol/Internet Protocol (TCP/IP) model is another example. The TCP/IP model is most commonly used to describe Internet-related networking functionality, although it may be used to describe different types of networks as well. The TCP/IP model separates network configurations into five logical layers: physical layer, data link layer; network layer; transport layer; and application layer. These layers are well known in the art, and the following is merely a broad overview of each layer.

The physical layer includes the physical devices that form the underlying basis of the network, such as routers, switches, repeaters, network cables, network interface controllers (NICs), etc. The physical layer also includes low-level protocols for transmitting bits between the aforementioned physical devices.

The data link layer includes functionality for preparing packets for transmission (e.g., by adding transmission headers) and using the physical layer to transmit the packets. For example, dial-up modems often use Point-to-Point Protocol (PPP) at the data link layer, local area networks (LANs) often use Ethernet, and wireless LANs often use the Institute of Electrical and Electronics Engineers (IEEE) 802.11 standard. Many other data link layer protocols exist. The data link layer may be embedded in a NIC (e.g., in firmware or an integrated circuit within the NIC) or implemented in software (e.g., in a NIC device driver executing on a host operatively connected to the NIC).

The network layer includes addressing and routing functionality for moving packets from one device to another. For example, the IP suite (e.g., IPv4, IPv6, etc.), which includes functionality for routing packets from one specific IP address to another, belongs to the network layer. The network layer is most commonly implemented in software.

The transport layer manages flow control and connection states between devices. Some transport layer protocols are connection-oriented (e.g., TCP), while others are connectionless (e.g., User Datagram Protocol (UDP)). Each transport layer protocol is responsible for enforcing quality of service (QoS) parameters required by the protocol, such as data fragmentation, error correction, retry policy, traffic congestion control, etc. The transport layer is typically implemented in software.

The application layer includes protocols that may be used directly by applications, such as Hypertext Transport Protocol (HTTP), File Transport Protocol (FTP), Post Office Protocol version 3 (POP3), Teletype Network (TELNET), etc. These protocols are typically implemented in software.

SUMMARY

In general, in one aspect, the invention relates to a method for using offloaded transport layer protocols. The method comprises signaling a network interface controller (NIC) with a first signal to use a transport layer protocol selected from a plurality of transport layer protocols embedded in the NIC, and transmitting a data packet via the NIC using the transport layer protocol.

In general, in one aspect, the invention relates to a network interface controller (NIC). The NIC comprises a network interface, a plurality of transport layer protocols embedded in the NIC, and a processor configured to receive a first signal to use a transport layer protocol selected from the plurality of transport layer protocols embedded in the NIC, and transmit a data packet via the network interface using the transport layer protocol.

In general, in one aspect, the invention relates to a method for installing firmware on a network interface controller (NIC). The method comprises accessing a computer readable medium to obtain the firmware, and installing the firmware on the NIC, wherein the firmware comprises executable instructions for receiving a first signal to use a transport layer protocol selected from a plurality of transport layer protocols embedded in the NIC, and transmitting a data packet via a network interface using the transport layer protocol.

Other aspects of the invention will be apparent from the following description and the appended claims.

DETAILED DESCRIPTION

Figure 1:
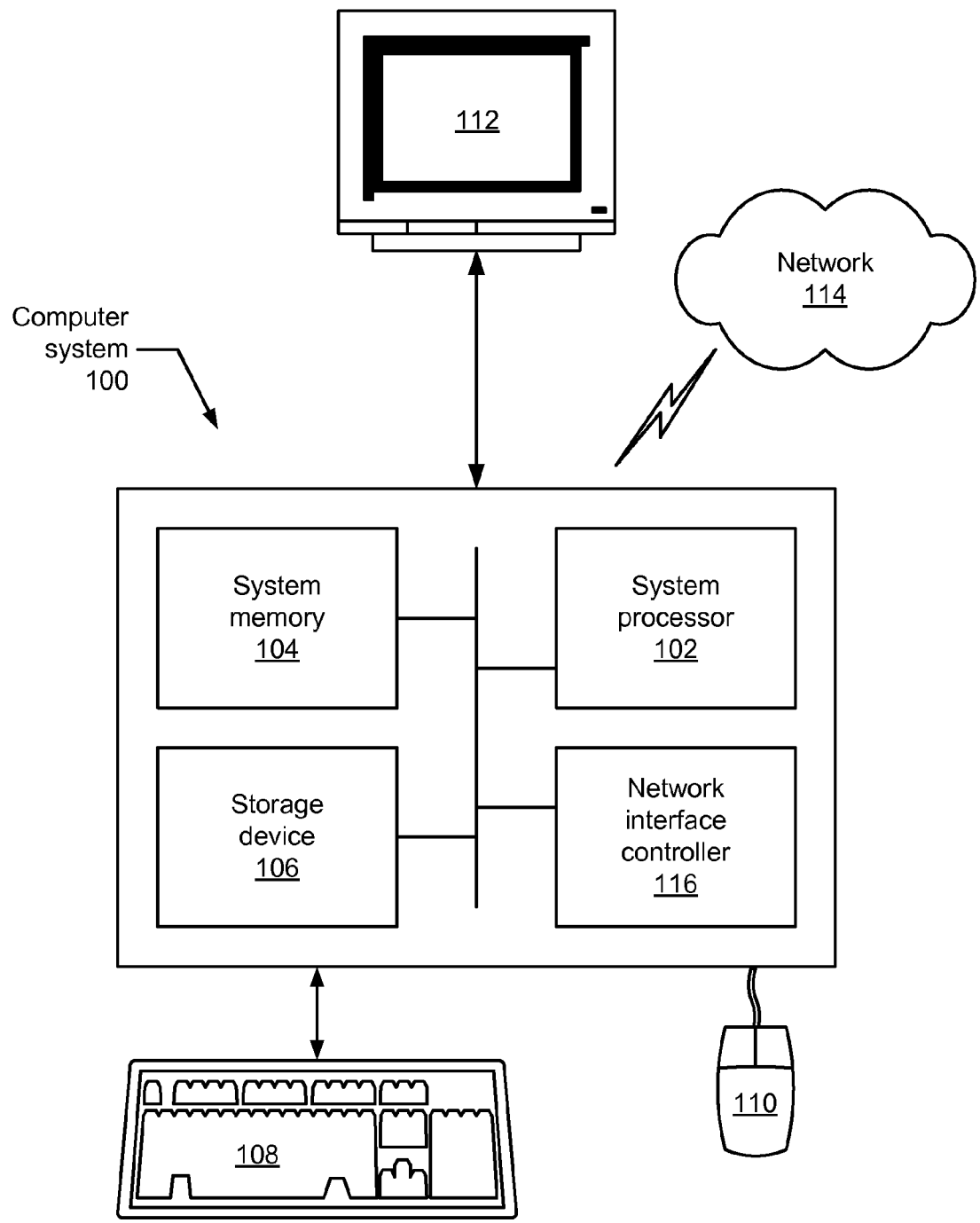
FIG. 1 shows a diagram of a computer system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for using offloaded transport layer protocols. More specifically, in one or more embodiments of the invention, multiple transport layer protocols are embedded in a NIC. The NIC receives a signal to use a designated transport layer protocol, and sends a data packet using the designated transport layer protocol. Further, in one or more embodiments, the NIC includes functionality to dynamically load one or more transmission control protocols.

Embodiments of the invention may be implemented on virtually any type of computer regardless of the platform being used. For example, FIG. 1 shows a diagram of a computer system (100) in accordance with one or more embodiments of the invention. The computer system (100) includes a system processor (102), associated system memory (104), a storage device (106), and numerous other elements and functionalities typical of today's computers (not shown). The computer system (100) may also include input means, such as a keyboard (108) and a mouse (110), and output means, such as a monitor (112). Those skilled in the art will appreciate that these input and output means may take other forms. Further, the computer system (100) may be a mobile device, such as a cellular telephone, personal digital assistant (PDA), portable multimedia device, etc.

Further, the computer system (100) includes a NIC (116) providing a connection to a network (114). The network (114) may be a local area network (LAN), a wide area network (WAN) such as the Internet, any other similar type of network, or any combination thereof. The NIC (116) may be a wireless NIC, a wired NIC such as an Ethernet controller, or any other type of NIC. Those skilled in the art will appreciate that the computer system (100) may include multiple NICs (not shown), which may be operated independently and/or cooperatively and connected to the same or different networks.

In one or more embodiments, the NIC (116) includes multiple transport layer protocols embedded therein, and is configured to use different transport layer protocols in different situations. Specifically, the NIC (116) is configured to receive a signal designating a specific transport layer protocol to use, and then transmit a data packet over the network (114) using that transport layer protocol. Thus, the NIC (116) is effectively configured to use different transport layer protocols depending on the signal(s) received.

In one or more embodiments, the NIC is configured to use different transport layer protocols for different flow states. Alternatively, the NIC may use the same transport layer protocol for two or more flow states. For example, the NIC may include a pipelined control system to isolate flow states, similar to how some system processors isolate distinct program execution threads. Using designated transport layer protocols is discussed in detail below.

Those skilled in the art will appreciate that one or more elements of the aforementioned computer system (100) may be located at a remote location and connected to the other elements over a network. Further, the computer system (100) may be located in a distributed system having multiple nodes, where each portion of the computer system (100) (e.g., system processor (105), system memory (110), storage device (115), input and/or output means, etc.) may be located on a different node within the distributed system. In one or more embodiments, the node corresponds to a computer system. Alternatively, the node may correspond to a processor with associated physical memory. The node may alternatively correspond to a processor with shared memory and/or resources.

Figure 2:
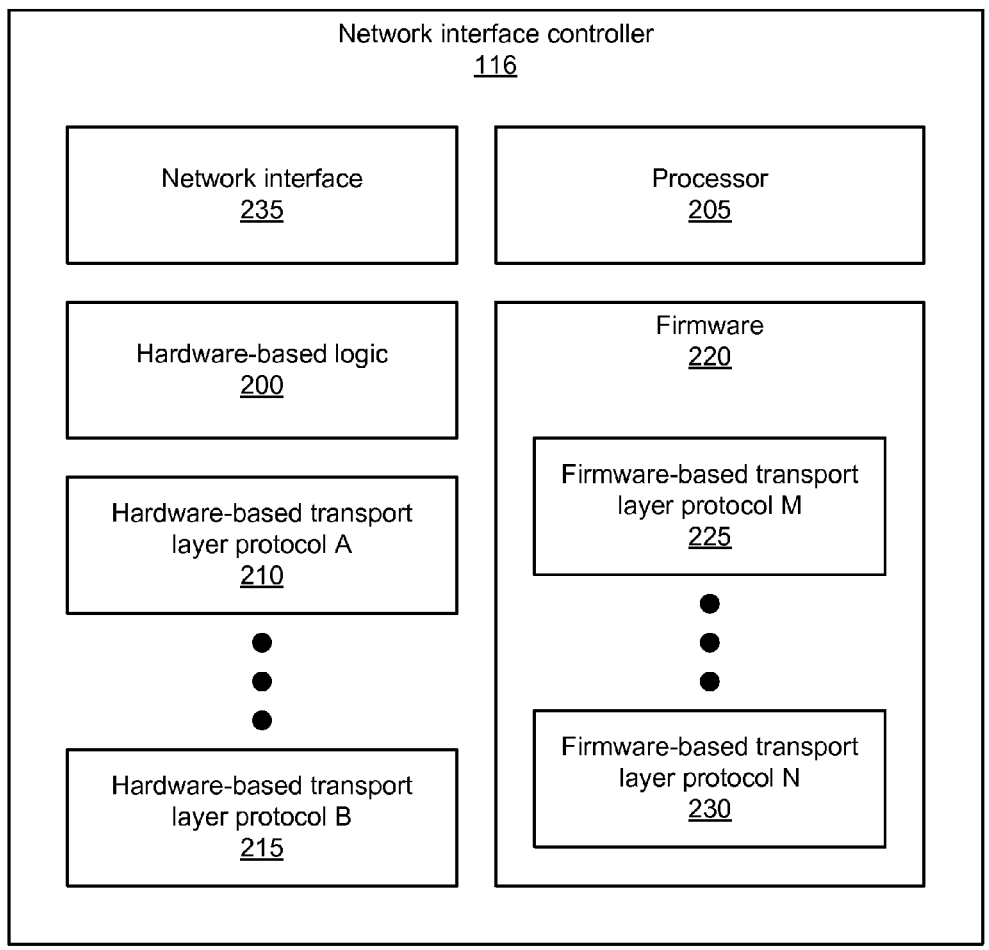
FIG. 2 shows an expanded diagram of a NIC in accordance with one or more embodiments of the invention.

As discussed above, transport layer protocols used in TCP/IP and other similar network stack models are typically implemented in software. However, in one or more embodiments of the invention, one or more transport layer protocols are embedded in the NIC (116) instead. To illustrate the concept of embedded transport layer protocols, FIG. 2 shows an expanded diagram of the NIC (116) in accordance with one or more embodiments of the invention. To avoid unnecessarily complicating the following discussion, many well-known features of NICs have been omitted from FIG. 2.

In one or more embodiments, the NIC (116) includes one or more hardware-based transport layer protocols (e.g., hardware-based transport layer protocol A (210), hardware-based transport layer protocol B (215)). Specifically, a hardware-based transport layer protocol may be implemented in fixed-logic hardware such as an application specific integrated circuit (ASIC), reprogrammable-logic hardware such as a field-programmable gate array (FPGA), any other similar type of hardware, or any combination thereof.

Further, the NIC (116) may include firmware (220) storing executable instructions for use by a processor (205) in the NIC (116). Specifically, the firmware (220) may include one or more firmware-based transport layer protocols (e.g., firmware-based transport layer protocol M (225), firmware-based transport layer protocol N (230)) defining transport layer protocols for use by the NIC (116).

The firmware (220) may be embedded in electrically erasable programmable read-only memory (EEPROM), flash memory, a micro-drive, any other similar type of storage in the NIC (116), or any combination thereof. To install firmware (e.g., 220) on a NIC (e.g., 116), the firmware is typically first stored on a computer readable medium such as a compact disc (CD), a diskette, a flash drive, a tape, a file, or any other computer readable storage device. The computer readable medium is accessed to obtain the firmware, and the firmware is then stored on the NIC. In one or more embodiments, firmware is installed on the NIC (116) to allow the NIC (116) to perform an embodiment of the method described in FIG. 3.

Many different factors may influence whether to use hardware-based transport layer protocols, firmware-based transport layer protocols, or a combination of hardware-based and firmware-based protocols. Further, many different factors may influence whether to use fixed-logic hardware, reprogrammable-logic hardware, or a combination or fixed-logic and reprogrammable-logic hardware. For example, the decision of whether to use fixed-logic hardware, reprogrammable-logic hardware, and/or firmware to implement a transport layer protocol may depend on factors such as performance requirements, economies of scale, etc. In one or more embodiments, the NIC (116) includes a combination of hardware-based and firmware-based transport layer protocols. Alternatively, the NIC (116) may only include hardware-based transport layer protocols or only firmware-based transport layer protocols.

Regardless of whether transport layer protocols are implemented in hardware and/or firmware, many different types of transport layer protocols may be embedded in the NIC (116). Examples of transport layer protocols include TCP Tahoe, TCP Reno, TCP Vegas, TCP NewReno, TCP Hybla, TCP Westwood, TCP Selective Acknowledgement Options (SACK), Hamilton TCP (HTCP), HighSpeed TCP (HSTCP), Binary Increase Congestion (BIC) TCP, Cubic BIC (CUBIC) TCP, Fast Active Queue Management Scalable TCP (FAST), Scalable TCP (STCP), Smart Acknowledgement (ACK) Dropper (SAD), User Datagram Protocol (UDP), etc. Those skilled in the art will appreciate that the invention is not limited to the aforementioned listing of transport layer protocols. Further, a transport layer protocol may be used that does not include any form of congestion control.

As discussed above, the NIC (116) is configured to receive a signal to use a designated transport layer protocol (i.e., hardware- and/or firmware-based), and use the designated transport layer protocol to transmit a data packet (i.e., via a network interface (235)). Specifically, the NIC (116) includes logic for examining the signal and initiating execution of the designated transport layer protocol based on the signal. In one or more embodiments, hardware-based logic (200) is used to initiate execution of the designated transport layer protocol. Alternatively, such logic may be embedded in firmware (220) and executed by the processor (205). Further, a combination of hardware-based and firmware-based logic may be used. In one or more embodiments, the logic supports concurrent execution of multiple transport layer protocols. Specifically, transport layer protocols may be executed concurrently to allow different flow states to use different transport layer protocols.

Figure 3:
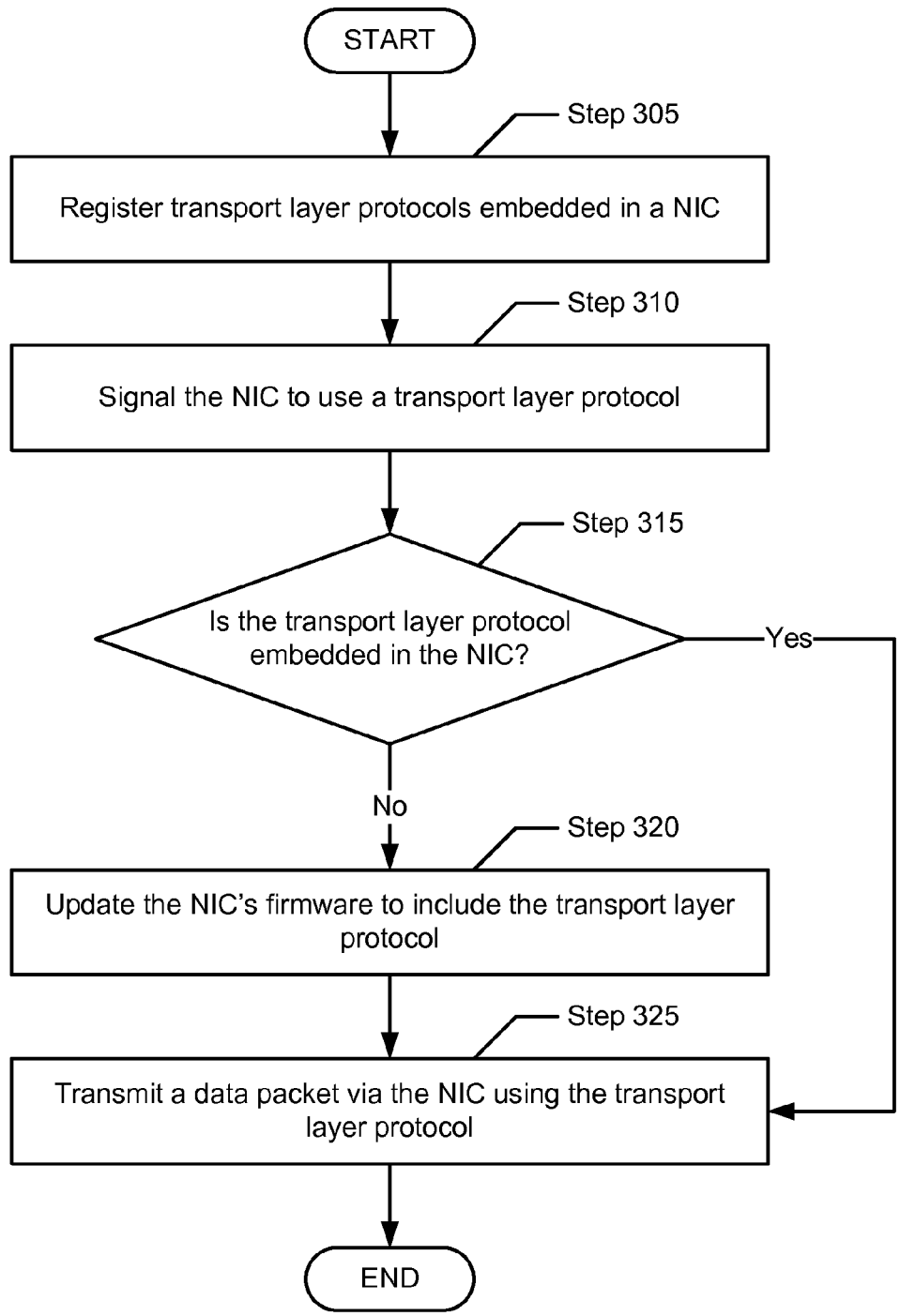
FIG. 3 shows a flowchart of a method for using offloaded transport layer protocols in accordance with one or more embodiments of the invention.

FIG. 3 shows a flowchart of a method for using offloaded transport layer protocols in accordance with one or more embodiments of the invention. In one or more embodiments, one or more of the steps shown in FIG. 3 may be omitted, repeated, and/or performed in a different order. Further, one or more steps may be performed concurrently. Accordingly, the specific arrangement of steps shown in FIG. 3 should not be construed as limiting the scope of the invention.

As discussed above, using a designated transport layer protocol is achieved by transmitting a signal to the NIC designating the transport layer protocol to use. In one or more embodiments, software processes in the computer system may rely on protocol registration information to determine which transport layer protocols are available to use. Accordingly, in Step 305, transport layer protocols embedded in the NIC may be registered, i.e., recorded in the computer system for reference by software processes.

For example, in a Microsoft Windows environment, entries for the transport layer protocols may be written to the Windows Registry. Microsoft® is a registered trademark of Microsoft Corporation, located in Redmond, Wash., USA. As another example, entries for the transport layer protocols may be written to a text file, in a table in a database, or at any other similar location. Software processes may then access the registered entries to determine which transport layer protocols are available to use. In one or more embodiments, transport layer protocols are registered at system startup (e.g., during initialization of the NIC's device driver). Alternatively, transport layer protocols may be registered when the NIC is first added to the computer system, or at any other time when the computer system is active.

In one or more embodiments, the decision of which transport layer protocol to use is made by a network profiling service. Network profiling services are discussed, for example, in copending U.S. patent application Ser. No. _____, entitled "Method and System for Using Bayesian Network Inference for Selection of Transport Protocol Algorithm" (Attorney Docket No. 03226/914001; SUN061276) and "Method and System for Bi-level Congestion Control for Multipath Transport" (Attorney Docket No. 03226/916001; SUN070030) and filed on Dec. 14, 2006, in the names of the same inventors and having the same assignee as the present application, the entire contents of which are incorporated above in their entirety.

Continuing with discussion of FIG. 3, in Step 310, the NIC is signaled to use a particular transport layer protocol. The NIC may be signaled by an operating system kernel, a NIC device driver, a network profiling service, a software application, or by any other similar process executing in the computer system.

In one or more embodiments, signaling the NIC involves setting a variable in a flow state stored in memory in the computer system and/or in the NIC. Alternatively, the NIC may include a transport layer protocol designation variable (e.g., a hardware register, a firmware variable, or any other similar type of variable), and signaling the NIC may involve modifying the transport layer protocol designation variable to designate a transport layer protocol to use. As another alternative, the NIC may be signaled by storing a transport layer protocol designation flag in a header of a data packet, and the NIC may examine the data packet to retrieve the transport layer protocol designation flag. In one or more embodiments, the signal applies to all flow states handled by the NIC. Alternatively, different signals may be applied to different flow states, thereby providing performance enhancements on a per-flow basis.

As discussed above, one or more transport layer protocols may be implemented in firmware, and the firmware may be updatable. In one or more embodiments, if the signal received by the NIC designates a transport layer protocol that is not embedded in the NIC, the NIC may update the firmware to include the designated transport layer protocol.

Specifically, in Step 315, a determination may be made about whether the designated transport layer protocol is embedded in the NIC. If the designated transport layer protocol is not embedded in the NIC, then in Step 320, the NIC's firmware may be updated to include the designated transport layer protocol. Specifically, a copy of the designated transport layer protocol may already be stored elsewhere in the computer system (e.g., in system memory, on a storage device, etc.), and the copy may be used to update the NIC's firmware.

In one or more embodiments, supporting firmware updates based on transport layer protocol designation signals allows for a larger number of transport layer protocols to be supported, thereby allowing for per-flow performance tuning that would not be available if the set of supported transport layer protocols were fixed. For example, a software application may be able to supply a specific transport layer protocol to use, thereby providing a network performance improvement for that software application.

Those skilled in the art will appreciate that if the NIC does not support firmware updates in this manner and an unsupported transport layer protocol is designated in Step 310, then an error condition may result (not shown). Alternatively, the NIC may signal the computer system that the designated transport layer protocol is not available and request that a different transport layer protocol be designated by the computer system. As another alternative, the NIC may signal the computer system that the designated transport layer protocol is not available and indicate that the data packet will be sent using a different transport layer protocol (e.g., a default transport layer protocol).

Continuing with the discussion of FIG. 3, the NIC's firmware may be updated at different times. Specifically, in one or more embodiments, the firmware is updated while the NIC is available to send and/or receive data packets, for use by a currently active flow state. Alternatively, the NIC's firmware may be updated at a later time, e.g., at a time when no network traffic is flowing through the NIC. Waiting to update the NIC's firmware may protect against performance penalties (e.g., delays, slowdowns, etc.) caused by the updating process. In such cases, the updated firmware is then available to use with subsequent flow states.

In Step 325, a data packet is transmitted via the NIC using the designated transport layer protocol. Specifically, logic in the NIC causes hardware and/or software instructions associated with the designated transport layer protocol to be executed, thereby transmitting the data packet via a network interface to a device in the network to which the NIC is operatively connected. In one or more embodiments, the transmitted data packet belongs to a flow state that was already active when the signal was received in Step 310. In other words, the transport layer protocol used for a given flow state may be switched while the flow state is still active. Alternatively, the transmitted data packet may be associated with a different flow state.

In view of the above, those skilled in the art will appreciate that designating a transport layer protocol for a flow state may also affect handling of data packets received by the NIC. Specifically, if a data packet is received as part of a flow state after a particular transport layer protocol is designated for that flow state, the designated transport layer protocol's receive function may be executed to handle the received data packet.

The following is an example of performing the method described above. The following discussion is provided for exemplary purposes only and should not be construed as limiting the scope of the invention.

Suppose a NIC includes UDP embedded in an ASIC, and TCP NewReno embedded in firmware. The computer system is executing a network profiling service and a Voice over IP (VoIP) application. Initially, the VoIP application uses TCP NewReno. However, the network profiling service determines that improved VoIP performance could be obtained using FAST TCP. Specifically, FAST TCP generally provides a lower queuing delay than TCP NewReno, thereby decreasing voice lag in VoIP applications. Therefore, the network profiling service modifies a transport layer protocol designation variable in the VoIP application's flow state to signal the NIC to use FAST TCP. The network profiling service also signals the NIC to disable TCP retransmission features, since retransmissions are generally too slow to be useful in VoIP applications.

Upon reading the transport layer protocol designation variable, the NIC determines that FAST TCP is not currently available in the NIC. Therefore, the NIC issues an interrupt requesting that the NIC's firmware be updated to include FAST TCP. Because updating the firmware at this point might interrupt the VoIP application's data flow, the network profiling service waits until the VoIP application terminates. Once the VoIP application terminates, the network profiling service provides a copy of FAST TCP to the NIC, and the NIC updates its firmware accordingly. At this point, FAST TCP is available for use in subsequent VoIP sessions or for any other networking application that requests the use of FAST TCP.

In one or more embodiments, offloading transport layer protocols to a NIC frees system processing cycles for use by other processes. Further, as discussed above, providing multiple transport layer protocols embedded in a NIC allows for networking to be optimized on a per-flow basis.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for using offloaded transport layer protocols comprising:

signaling a network interface controller (NIC) with a first signal to use a first transport layer protocol selected from a plurality of transport layer protocols embedded in the NIC;

transmitting a first data packet via the NIC using the first transport layer protocol;

signaling the NIC with a second signal to use a second transport layer protocol, wherein the second transport layer protocol is not in the plurality of transport layer protocols embedded in the NIC when the second signal is received;

providing, to the NIC, the second transport layer protocol; and transmitting the second data packet via the NIC using the second transport layer protocol.

2. The method of claim 1, further comprising:

registering the plurality of transport layer protocols with an operating system to obtain a plurality of registered transport layer protocols, wherein signaling the NIC to use the transport layer protocol is based on the plurality of registered transport layer protocols.

3. The method of claim 1, wherein at least one of the plurality of transport layer protocols is embedded in the NIC as firmware.

4. The method of claim 3, wherein the NIC updates the firmware to add the second transport layer protocol to the plurality of transport layer protocols embedded in the NIC.

5. The method of claim 1, wherein at least one of the plurality of transport layer protocols is embedded in the NIC as an integrated circuit, and wherein at least one of the plurality of transport layer protocols is embedded in the NIC as firmware.

6. The method of claim 1, wherein signaling the NIC comprises modifying a transport layer protocol designation variable stored on the NIC.

7. The method of claim 1, wherein signaling the NIC comprises storing a transport layer protocol designation flag in a header of the data packet.

8. The method of claim 1, wherein the plurality of transport layer protocols comprises at least one selected from a group consisting of transmission control protocol (TCP) Tahoe, TCP Reno, TCP Vegas, TCP NewReno, TCP Hybla, TCP Westwood, TCP Selective Acknowledgement Options (SACK), Hamilton TCP (HTCP), HighSpeed TCP (HSTCP), Binary Increase Congestion (BIC) TCP, Cubic BIC (CUBIC) TCP, Fast Active Queue Management Scalable TCP (FAST), Scalable TCP (STCP), Smart Acknowledgement (ACK) Dropper (SAD), and User Datagram Protocol (UDP).

9. A network interface controller (NIC) comprising:

a network interface;

a plurality of transport layer protocols embedded in the NIC;

a processor; and a memory comprising executable instructions which, when executed by the processor, cause the NIC to:

receive a first signal to use a transport layer protocol selected from the plurality of transport layer protocols embedded in the NIC, and determine whether the transport layer protocol is currently available on the NIC; and transmit, in response to determining that the transport layer protocol is currently available on the NIC, a data packet via a network interface using the transport layer protocol;

receive a second signal to use a new transport layer protocol, wherein the new transport layer protocol is not in the plurality of transport layer protocols embedded in the NIC when the second signal is received; and update the firmware, in response to determining that the new transport layer protocol is not currently available on the NIC, to add the new transport layer protocol to the plurality of transport layer protocols embedded in the NIC in response to the second signal.

10. The NIC of claim 9, wherein at least one of the plurality of transport layer protocols is embedded in the NIC as firmware.

11. The NIC of claim 9, wherein at least one of the plurality of transport layer protocols is embedded in the NIC as an integrated circuit, and wherein at least one of the plurality of transport layer protocols is embedded in the NIC as firmware.

12. The NIC of claim 9, wherein receiving the first signal comprises accessing a transport layer protocol designation variable stored on the NIC.

13. The NIC of claim 9, wherein receiving the first signal comprises accessing a transport layer protocol designation flag in a header of the data packet.

14. The NIC of claim 9, wherein the plurality of transport layer protocols comprises at least one selected from a group consisting of transmission control protocol (TCP) Tahoe, TCP Reno, TCP Vegas, TCP NewReno, TCP Hybla, TCP Westwood, TCP Selective Acknowledgement Options (SACK), Hamilton TCP (HTCP), HighSpeed TCP (HSTCP), Binary Increase Congestion (BIC) TCP, Cubic BIC (CUBIC) TCP, Fast Active Queue Management Scalable TCP (FAST), Scalable TCP (STCP), Smart Acknowledgement (ACK) Dropper (SAD), and User Datagram Protocol (UDP).

* * * * *